*(12)* United States Patent
Glass et al.

(10) Patent No.: US 8,510,100 B2
(45) Date of Patent: Aug. 13, 2013

(54) HUMAN READABLE SENTENCES TO REPRESENT COMPLEX COLOR CHANGES

(75) Inventors: Brian R. Glass, Wilsonville, OR (US); Jeremy Griffith, East Rochester, NY (US); Paul W. Philippi, Sherwood, OR (US); Michael T. Stevens, Aloha, OR (US)

(73) Assignee: Xerox Corporation, Norwalk, CT (US)

( * ) Notice: Subject to any disclaimer, the term of this patent is extended or adjusted under 35 U.S.C. 154(b) by 149 days.

(21) Appl. No.: 12/783,633

(22) Filed: May 20, 2010

(65) Prior Publication Data

US 2011/0288854 A1 Nov. 24, 2011

(51) Int. Cl.
*G06F 17/26* (2006.01)
*G09B 19/00* (2006.01)
(52) U.S. Cl.
USPC .................................. 704/9; 434/98
(58) Field of Classification Search
USPC ............................... 704/9; 434/98
See application file for complete search history.

(56) References Cited

U.S. PATENT DOCUMENTS

| | | | |
|---|---|---|---|
| 5,655,062 A * | 8/1997 | Tompkins et al. ............. | 358/1.9 |
| 6,704,467 B2 * | 3/2004 | Uchida ........................ | 382/311 |
| 6,801,604 B2 * | 10/2004 | Maes et al. .................. | 379/88.17 |
| 6,924,828 B1 * | 8/2005 | Hirsch .......................... | 715/800 |
| 7,191,119 B2 * | 3/2007 | Epstein et al. ................... | 704/10 |
| 7,568,160 B2 * | 7/2009 | Berger et al. .................. | 715/750 |
| 7,631,168 B1 * | 12/2009 | Muellers et al. .............. | 712/220 |
| 7,792,678 B2 * | 9/2010 | Hung ........................... | 704/275 |
| 2004/0264767 A1 * | 12/2004 | Pettigrew ..................... | 382/162 |
| 2006/0025987 A1 * | 2/2006 | Baisley et al. .................... | 704/4 |
| 2008/0003547 A1 * | 1/2008 | Woolfe et al. .................. | 434/98 |
| 2008/0007749 A1 * | 1/2008 | Woolfe ......................... | 358/1.9 |
| 2008/0316205 A1 * | 12/2008 | Jaynes ......................... | 345/420 |
| 2009/0073465 A1 * | 3/2009 | Rolleston et al. .............. | 358/1.9 |
| 2009/0319271 A1 * | 12/2009 | Gross .......................... | 704/246 |
| 2010/0085377 A1 * | 4/2010 | Woolfe ......................... | 345/594 |
| 2010/0086230 A1 * | 4/2010 | Bala et al. ..................... | 382/276 |
| 2010/0105364 A1 * | 4/2010 | Yang ........................ | 455/414.1 |
| 2010/0306645 A1 * | 12/2010 | Roulland et al. .............. | 715/271 |
| 2011/0128558 A1 * | 6/2011 | Stevens et al. ................. | 358/1.9 |
| 2011/0135195 A1 * | 6/2011 | Marchesotti et al. ......... | 382/165 |
| 2011/0288854 A1 * | 11/2011 | Glass et al. ...................... | 704/9 |
| 2012/0001934 A1 * | 1/2012 | Bala et al. ..................... | 345/594 |
| 2012/0032968 A1 * | 2/2012 | Fan et al. ...................... | 345/589 |

* cited by examiner

*Primary Examiner* — David R Hudspeth
*Assistant Examiner* — Timothy Nguyen
(74) *Attorney, Agent, or Firm* — Fay Sharpe LLP (57) ABSTRACT

Methods and a system for a natural language control interface are provided to enable a user to modify various properties of a document. The modifications comprise building sentences from modification words, and combining them together in one display. The modifications are displayed in real time for a user to observe as they are inputted. The order of the modifications is managed by the user and is configured to be changed, added and/or removed.

17 Claims, 7 Drawing Sheets

HUMAN READABLE SENTENCES TO REPRESENT COMPLEX COLOR CHANGES

CROSS REFERENCE TO RELATED PATENTS AND APPLICATIONS

The following co-pending applications, the disclosure of which is incorporated herein by reference in its entirety is mentioned:

U.S. application Ser. No. 11/762,155 filed Jun. 13, 2007, entitled NATURAL LANGUAGE COLOR SLECTOR AND NAVIGATOR FOR SELECTING COLORS FORM A COLOR SET, by Florent Perronnin, Robert R. Buckley, and John C. Handley.

BACKGROUND

The exemplary embodiment relates to fields of image processing. It finds particular application in connection with the provision of a user interface for implementing image modifications within a document, and is described with particular reference thereto. However, a more general application can be appreciated with regards to image classification, image content analysis, image archiving, image database management and searching, and so forth.

Various color models exist for extracting and representing color within an image. A color model is an abstract mathematical model describing the way colors can be represented as tuples of numbers, typically as three or four values of color components (e.g., RGB and CMYK are color models). However, a color model with no associated mapping function to a color space is a more or less an arbitrary system without any universal understanding of color interpretation.

Providing a mapping function between a color model and a certain reference color space results in a definite "footprint" within the reference color space. This "footprint" is known as a gamut, which defines a new color space. For example, Adobe RGB and sRGB are two different absolute color spaces, both based on the RGB model.

However, color spaces can be defined without the use of a color model. These spaces, such as Pantone, are in effect a given set of names or numbers which are defined by the existence of a corresponding set of physical color swatches.

A wide range of colors can be created by the primary colors of pigment (cyan (C), magenta (M), yellow (Y), and black (K)). Those colors then define a specific color space. A 3-D space, for example, provides a unique position for every possible color that can be created by combining those three pigments.

However, other possible color spaces can exist as well. For instance, when colors are displayed on a computer monitor, they are usually defined in the RGB (red, green and blue) color space. This is another way of making nearly the same colors (limited by the reproduction medium, such as the phosphor (CRT) or filters and backlight (LCD)), where red, green and blue can be considered as the X, Y and Z axes. Another way of making the same colors is to use their Hue (X axis), Saturation (Y axis), and brightness Value (Z axis), which is known as the HSV color space.

Colors vary in several different ways, including hue (red vs. orange vs. blue), saturation, brightness, and gloss. Some color words are derived from the name of an object of that color, such as "orange" or "salmon", while others are abstract, like "red".

Every natural language that has words for colors is considered to have from two to twelve basic color terms. All other colors are usually considered by speakers of that language to be variants of these basic color terms. For example, English contains the eleven basic color terms "black," "white," "red," "green," "yellow," "blue," "brown," "orange," "pink," "purple" and "gray," which is reflected in the standard Crayola set. Italian and Russian have twelve, distinguishing blue and azure. Thus, different cultures have different terms for colors, and may also assign some color names to slightly different parts of the spectrum. For instance, the Chinese have a character for a color covering both blue and green, while blue and green traditionally are shades of that color character. South Korea, on the other hand, differentiates between blue and green with different characters.

Other properties within an image also exists other than color. For example, properties, such as the sharpness of an image, luminescence, blurriness, etc. can also be modified.

The need arises, therefore, for a natural language user interface (LUI) within image processing applications for image editing that can significantly bridge communication and cultural gaps among users and provide a simple and easy to use tool for creating desired changes. While the science of chromatics and the underlying terminology is understood by developers of LUIs, building a computer human interface with UI controls for creating, selecting, and modifying image data in applications for an everyday user presents a challenge.

INCORPORATION BY REFERENCE

The following references, the disclosures of which are incorporated in their entireties by reference, are mentioned:

U.S. Pub. No. 2008/0007749, published Jan. 10, 2008, entitled NATURAL LANGUAGE COLOR COMMUNICATION AND SYSTEM INTERFACE, by Geoffrey J. Woolfe, discloses a natural language control system with a dictionary of color terms from pre-existing dictionaries for adjusting colors in images.

U.S. Pub. No. 2009/0290794, published Nov. 26, 2009, entitled IMAGE VISUALITZATION THROUGH CONTENT-BASED INSETS, by Luca Marchesotti, discloses a method an system for forming an inset image, including identifying a region of interest in an original image.

BRIEF DESCRIPTION

Methods and apparatus of the present disclosure provide exemplary embodiment for a user interface system that modifies images within a document in real time for a user. The image presented as a representative image or as the actual image in a view of the interface and presents image modifications as they are made by the user in a text-based interface alongside.

In an exemplary embodiment, a document is received from an image input device. An image modification is presented in real time within the image being displayed while the image modification is received as input from a user. A text-based interface is presented in a second view. The text-based interface comprises categories presented therein that correspond to portions of a human readable sentence used to generate the image modification.

In another embodiment, more than one human readable sentence is displayed in a second view. The human readable sentences correspond respectively to more than one image modification generated. Upon receiving a specified ordering with a corresponding priority, the human readable sentences are sorted for display according to the specified ordering. Sentences sorted with a higher priority in the ordering generate image modifications first before other sentences, and thus, affect the image modification of subsequent sentences first.

DETAILED DESCRIPTION

Aspects of the exemplary embodiment relate to a system and method for providing the ability to modify a document using natural language commands through a user interface. Natural language commands are particularly friendly for user interaction because the user identifies with the particular description in a familiar language. However, not all users may be familiar with the particular language. Therefore, human readable sentences identified by the user are provided in an interface that allows users to select portions of the sentences for creating complete sentences designating how a document are modified.

Various image modifications can be implemented within the user interfaces. For example, color modifications, object modifications, and/or picture modifications, such as blurriness, sharpness, etc. Consequently, the present disclosure is not limited to any specific type of modification, although the disclosure refers mainly to image modifications involving color as one example of the image modifications implemented within the system and methods herein.

Colors vary greatly in how they are designated. Thus, in one embodiment a user selects a color for an image modification to be implemented within the user's document. The colors are presented, for example, within an easy to use text-based interface under certain categories simply designed for eliciting a selection from a user for a specific color to be modified. For example, the categories may be titled with a question for eliciting a response from the user, and the colors may be selections presented as options for the user to select from among the categories. The selections may be color selections that are in the form of patches of colors or a color sample among a palette of colors that are presented. Further, the selection can comprise a text description of the particular color to compliment the color sample. This provides the advantage of eliminating some of the ambiguity with language, but allows an interface utilizing natural language to identify a selected color desired by users to be adjusted in a document, which may be any type of document (e.g., a photo image, a text document, presentation, etc.).

A human readable sentence representing a natural language command identifies the image modification to be generated through a natural language control system. Where a human readable sentence, for example, may be "make greens a lot more blue," the sentence generated becomes a command for mapping changes to regions of color space within the document. For example, affecting the regions of blue in a document to make them a lot more green. This concept will be discussed in more detail infra with respect to the methods and apparatus disclosed.

An image modification is based on the type of change to be modified in a document or the particular image within the document, the magnitude of the modification desired, and the resultant image modification (i.e., the direction of the modification within the document). For example, any color selected from the category of colors presented designates which color to be modified in a user document. As stated above, this color is selected from among color selections presented under a category of a text-based interface. For example, certain purples may be selected either from colors extracted out of the document and presented within a category for selecting the color to be modified or a number of pre-defined patches or color samples are presented. These samples may include a range of samples under each color. The range of purples, for example, comprises various purples of differ characteristics comprising various spectral characteristics, brightness values, hues, and/or saturation amounts. The colors provide different textures, such as glossy, grainy, fuzzy, etc. Additionally, the colors in the range of purples, for example, provide various shades considered within the purple spectrum of visible colors from which the user may choose from. Any number of colors therefore is selected for a color modification within the document. The colors can be pre-defined or extracted from the document for populating the category presented to the user for selection.

In another embodiment, objects within the document or properties of the image within the document may also be modified in a similar fashion. The disclosure is not limited to color.

The magnitude of change for a modification designates the amount or intensity in which the modification is implemented within the user's document. For example, natural color languages use additional words to describe color differences, and thus, the magnitude of the modification is specified in combination with the color selected. For example, phrases or words, such as "slightly less," "a lot more," "a little more," "a smidgen more," etc. can designate the intensity or amount in which the image modification is implemented. For example, if the user selects a shade of green, for example, under a first text-based category, and then selects "a lot more" in another second category, then this designates to modify these particular shades of greens in the document with a higher intensity of green. The disclosure, however, is not limited to any specific phrase or words, in any particular language, and/or does not preclude mathematical phrases or symbols, or other designations for a language, and/or color samples and symbols.

Additionally, a direction for the modification is a resultant image modification, in which the modification should be made towards within the document. For example, the user may first select a particular shade of green within the user's document for modification, and then, the user may select a magnitude or intensity (e.g., "a lot") for the modification under a second category, and finally, the user selects the direction in which the color modification should occur, which is the resultant color for adjustment towards (e.g., blue). A sentence is created that designates a complete and specific color modification to be implemented in the user's document that would make greens a lot more blue, for example. Consequently, the human readable sentence is representative of a natural language command for generating the particular image modification to be made to the document. For example, the sentence in the above example would read "a shade of green a lot more blue," if blue was the direction selected for green colors within the document to be modified.

Figure 1:
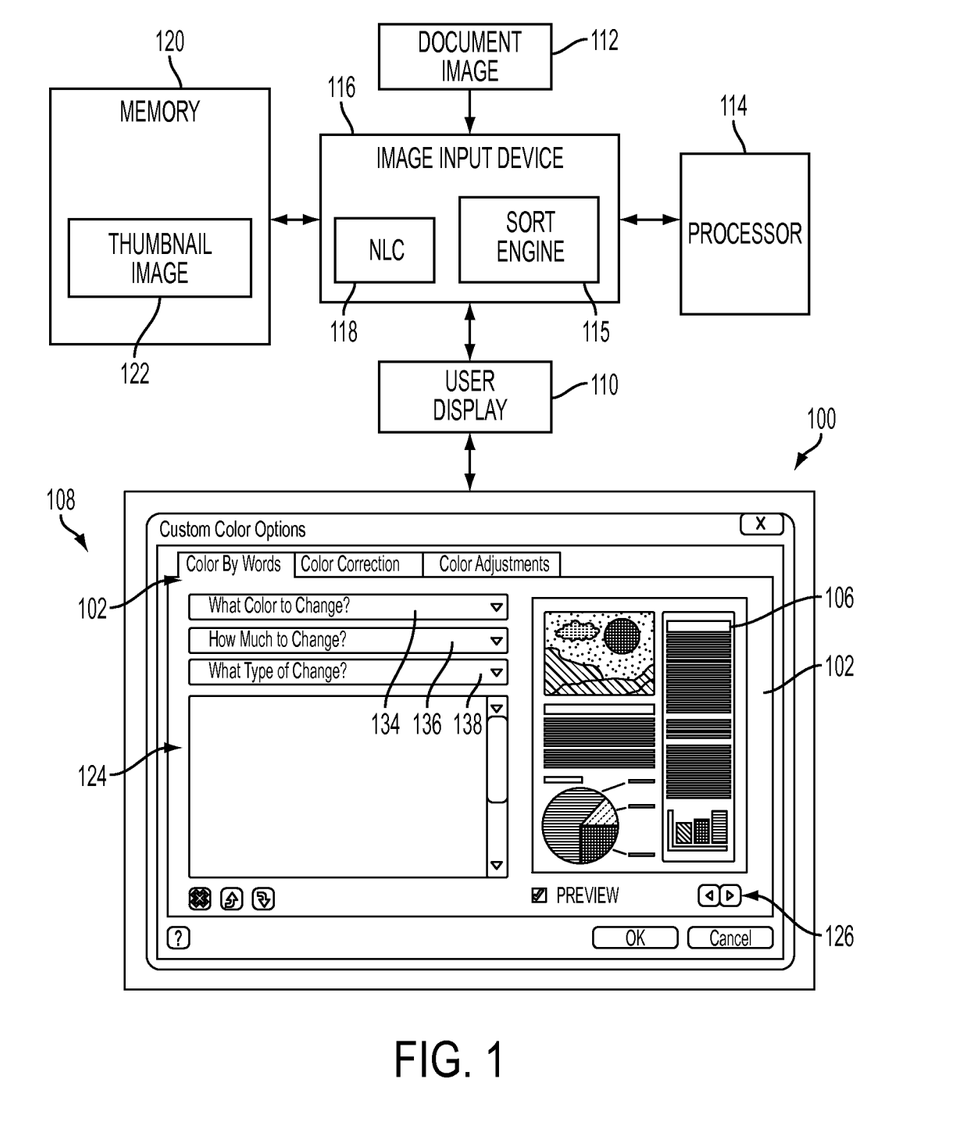
FIG. 1 is a functional block diagram of a user interface system comprising a natural language color control system and a user interface according to embodiments herein.

FIG. 1 illustrates one embodiment of an exemplary user interface system 100 for editing a user document. The system 100 comprises a processor 114 coupled to an image input device 116. The device comprises any device capable of executing a set of logical instructions and can comprise, for example, a computer, a personal digital assistant (FDA), digital camera, cell phone, printer, copier, or the like. Such devices can include the user interface 100, which may further comprise, but is not limited to, a key board, microphone, pointing device, display, speakers, audio/visual inputs/outputs network connections and/or other devices of the device 116 and/or processor 114.

The image input device 116 is configured to receive a document 112 for a color modification to be made by a user through the interface 100. The image input device 116 comprises a memory 120 for storing the document 114. A natural language control (NLC) system 118 executed via the processor 114 of the device 116, which can map the colors and/or features of the document 112 to a working color space in order for modifications entered by the user to be affected therein. The NLC 118 will be discussed in further detail infra.

A document can be provided by a user to an image processing system for processing images, such as a xerographic imaging system. The document may be any document, such a photo image, a text based document, or any document that may be printed, modified, and/or transferred in digital format, for example. A document may be any physical or digital representation of a body of information capable of being communicated to an output device for display, print, and/or alteration (e.g., a photo, or presentation document).

A user display 110 is coupled to the image input device and may be any display or multiple displays for viewing a graphical user interface or the user interface system 100 as an LUI. Stored within memory 120 are images that are graphic images for representing the user document 112 and/or a set of thumbnail images 122 included.

In general, each thumbnail image comprises image data derived from the respective document. Usually, the thumbnail image 122 contains less information than the original document, but not always. For example, each thumbnail image 122 may be a reduced resolution and/or cropped, digital image generated from the original document or processed original document. All of the thumbnails in the set may be the same size. In some embodiments, the image may be otherwise digitally modified in creating the thumbnail, for example by conversion from color to monochrome (e.g., a black and white thumbnail). In other embodiments, a representative portion of the image is automatically selected as the thumbnail, avoiding the need for reducing resolution or resizing. Indeed, the thumbnail can be any visual representation of the document which allows documents to be distinguished from each other in the set. In one embodiment, the thumbnail is a context-dependent image, as described, for example, in above-mentioned application Ser. No. 12/049,520 incorporated herein by reference. In such an approach, the portion of the image selected as the thumbnail may be dependent on the context in which the image is to be used. For example, if the user is known to be interested primarily in faces, a region of the image can be identified with suitable face recognition software and used as a basis for determining a suitable crop area.

The user display 110 comprises a first view 102 that displays an image 106 of the system 100, which can be the actual document 112, or a thumbnail image 122. The thumbnail images 122 may be selected by a user for representation of the document 112 within the interface system 100. For example, the first view 102 is a preview of the image 106 selected via preview controls 126. A user may select a representative image similar to the document for color modification, for example. The first view 102 presents the image modifications in real time to the user as selections are entered. In addition, the modifications build upon one another, and thus, the effect of multiple modifications are displayed in the image 106 selected for the first view 102.

The user interface 100 further comprises a second view 126 in which a text-based interface 102 is presented. In one embodiment, the text-based interface 102 is displayed alongside the image 106 for observing the modifications concurrently with receiving inputted commands at the text-based interface 102.

The text-based interface 102 comprises categories for receiving input for an image modification thereat. The categories are text-based categories 108, for example. Each of the categories represents a number of selections to be displayed within. A user selects a selection from each category in order for a human readable sentence to be comprised for representing a natural language command of a particular image modification, such as, for example, a color modification.

The text-based interface 102 of the interface system 100 comprises a first text-based category 134, a second text-based category 136, and a third text-based category 138. The first text-based category 134 includes selections therein (not shown) for selecting which color to modify within the user's document 110. For example, green may be selected or any other color may be selected. The second text-based category 136 includes selections therein that represent a magnitude (e.g., intensity) of the color modification. The third text-based category 138 includes selections for a resultant color or a direction for which the color modification is made. All three selections made within the first, second and third categories combine to form a human readable sentence effectuating a particular image modification.

In one embodiment, each text-based category is presented in the form of a question. The first text-based category 108 is presented as an activated menu that is entitled with a question for eliciting a user's input in a simple and easily conveyable manner. For example, the question illustrated in FIG. 1 has a drop-down menu that inquires a user interacting with the interface the following: "What Color to Change?"

A drop-down list is a user interface control GUI element, similar to a list box, which allows the user to choose one value from a list. When a drop-down list is inactive, it displays a single value or a category title as illustrated. When activated, it displays (drops down) a list of values or selections, from which the user may select from. When the user selects a new value, the control can revert to its inactive state, displaying the selected value.

The disclosure is not limited to any particular manner of drop-down list or the like. Although one design actually places the list box below the box showing the single value or category title, many other user interface designs (such as Motif) and Aqua from Mac OS X place the list box so that the currently-selected item is at the location of the box, thus eliminating the need to move a pointer to pick the same value. This is sometimes called a "popup list" or a "choice" or "chooser". A drop-down list differs from a combo box in that the entry portion of a drop-down list cannot be edited. Many various designs may be appreciated by one of ordinary skill in the art. An advantage of a drop-down list vs. a list box or tabs is that only one option is visible at a time and the box can be presented in the form of a question to elicit a portion of a color modification from a user from a list of selections or options. In addition, drop-down lists use far less space due to their show/hide functionality.

Figure 2:
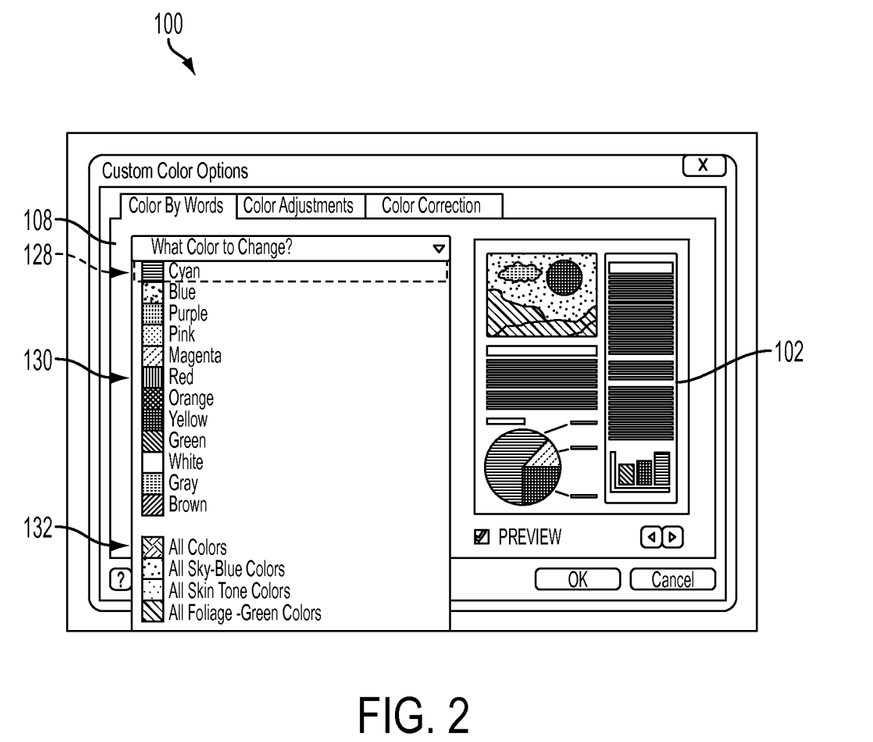
FIG. 2 is a schematic representation of a user interface screen according to embodiments herein.

Referring to FIG. 2, illustrates an exemplary embodiment of the user interface system 100. The text-based category 108 in this example questions the user for a color to be modified that is previewed within the image 102 and effectuating the user's document. A selected color 128 might be cyan, for example. Selections 130 provide multiple color samples with descriptions thereat for a user to select from. Selections 132 for certain shades or classes of colors are additionally provided. In addition, selections (not shown) representing colors of various image properties (e.g., hue, brightness, gloss, etc.) can also be provided.

Figure 3:
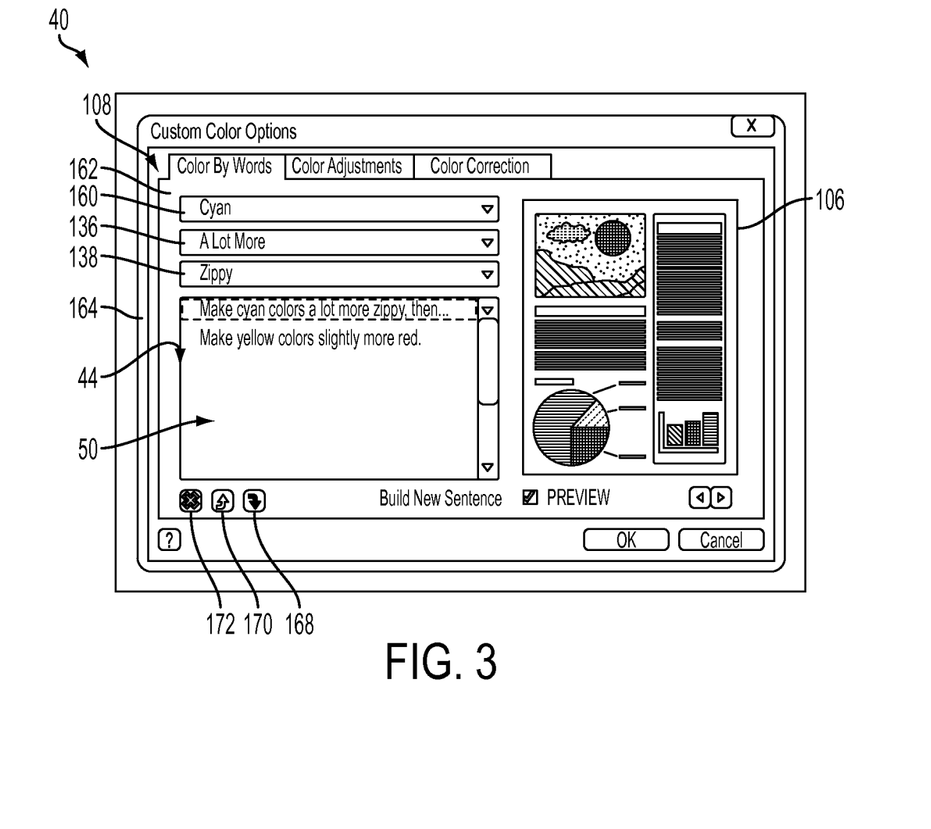
FIG. 3 is a schematic representation of a user interface screen according to embodiments herein.

FIG. 3 illustrates an exemplary embodiment of interface system 100 comprising human readable sentences 40. For example, a sentence 42 is displayed in a window 50, such as a scrollbar window, upon being compiled from the selections under the text-based categories 108. Each of the text-based categories comprises a portion of the sentence 42. A color selection 160, for example, comprises the portion of the sentence selecting the color to be modified, namely cyan. Additionally, a magnitude selection 162 comprises a portion of the sentence indicating an intensity of "a lot more" in which the color cyan should be adjusted. Likewise, a resultant color selection 164 comprises a portion of the sentence indicating that cyan colors in the user's document should be made a lot more zippy, for example. While zippy can be any color indicating a brownish-orange or a color known in the art comprising properties distinguishable from other color properties.

Each human readable sentence is presented for display to a user in the window 50 in an order in which each sentence affects the image modification in the image 106. In one embodiment, the user is capable of altering the order of the human readable sentences 40 for various expressions to result in priority in which modifications are implemented within the user's document.

Referring back to FIG. 1, a sorting engine 115 is configured to sort the human readable sentences 40 of FIG. 3 corresponding to a respective modification. For example, the sentence 42 modifies cyan colors in the image 106 to make them a lot more zippy. The sentence 44 thereafter produces all yellow colors slightly more red. Consequently, if zippy is meant to define a shade of yellow, then all cyan colors will be made a lot more yellow, and these regions within the color space of the document/image 106, in addition to other regions that were yellow already will be made more red.

In one embodiment, the user can specify a priority of the sentences, such as via a control feature 168 and 170 (e.g., an arrow button) and/or delete a sentence at a delete 172 if the modification shown in the image 106 is not desirable. The arrows can move the sentences to provide a specified priority to each sentence, in which the modifications presented first, will be the first to be expressed within the image 106.

Figure 7:
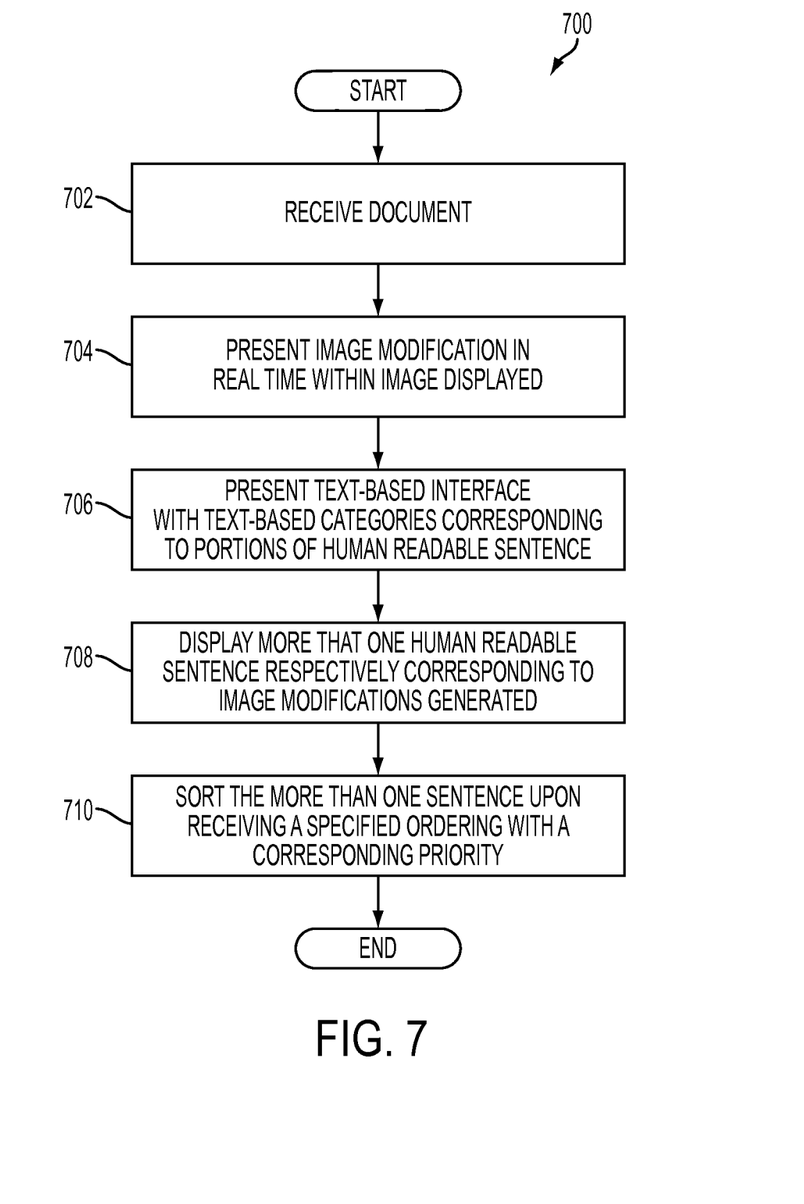
FIG. 7 is a flowchart detailing a method for a user interface system that generates image modifications within an image.

An example methodology 700 for implementing a user interface system for modifying colors of a document is illustrated in FIG. 7. While the method 700 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 702 a document is received from an image output device of a user interface system. The user interface system is configured to modify the document with imaging components using a natural language control system discussed in detail herein.

At 704 an image modification is presented in real time within an image displayed in a first view of a display. Concurrently, the image modification is received as input from a user. This input is provided to the user at 706 within a text-based interface that may be alongside the first display of real time modifications being presented.

At 706 the text-based interface is presented with text-based categories corresponding to portions of a human readable sentence. In an exemplary embodiment, a first text-based category in the text-based interface provides various color selections for receiving a color to be modified in the document from the user. In addition, a second text-based category in the text-based interface provides selections for receiving a magnitude of the image modification or a resultant image modification. Further, a third text-based category in the text-based interface provides selections that are different from the second text-based category for receiving the magnitude or the resultant image modification. For example, if the second text-based category provides selections for magnitude, the third text-based category can provide selections for the resultant image modification.

At 708 more than one human readable sentence is displayed. The human readable sentences correspond to more than one image modification and may be displayed alongside the first view in a second view of the text based-interface to see modifications occur in the same display.

At 710 the sentences are sorted from a specified ordering being received as input. The ordering has a corresponding priority in which the sentence can affect modifications in the order provided. Sentences sorted with a higher priority in the specified ordering generate respective image modification in the image displayed first, before other modifications, and thus, can affect the image modification of subsequent sentences.

The method illustrated in FIG. 7 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 7, can be used to implement the method for editing images in a document.

Natural Language Control System

U.S. patent application Ser. No. 11/479,484 and U.S. patent application Ser. No. 11/762,155 are incorporated herein by reference in their entirety. Portions have been reproduced below to provide detailed support in the present disclosure.

Figure 4:
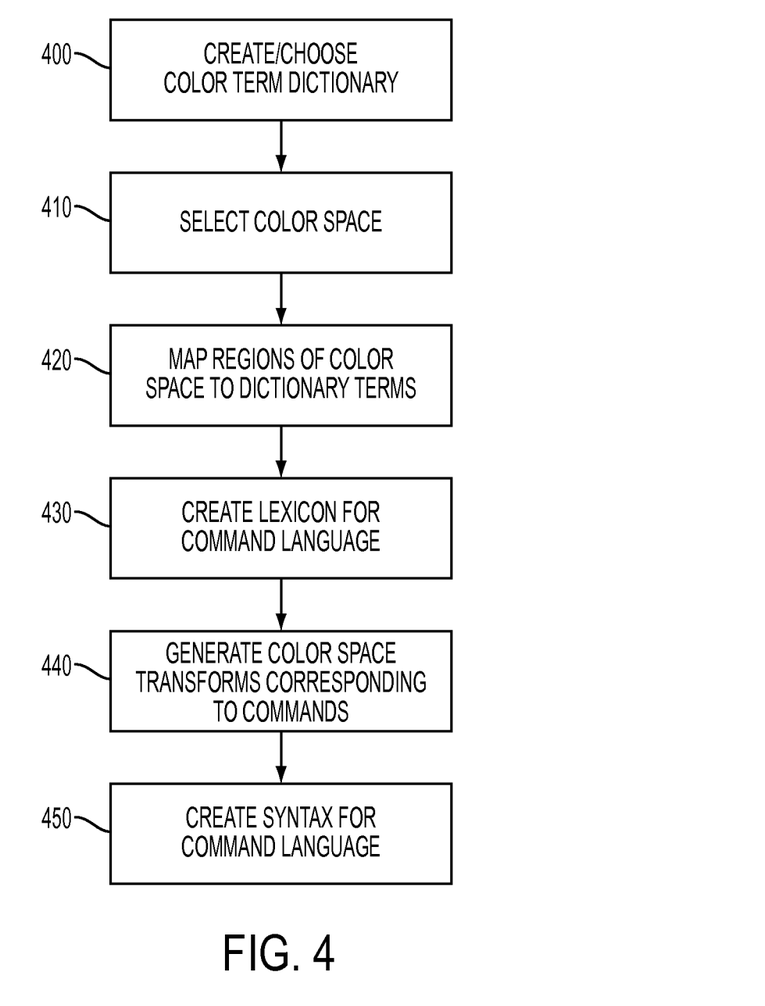
FIG. 4 is a flowchart detailing an exemplary method for correlating a working color space with a natural language dictionary of color terms.

A usable natural language control system could be created as described in the flowchart of FIG. 4. The acts are listed in a particular order in the flowchart. However, this order should not be considered limiting, as the order of many of these acts may be changed without affecting the resulting color control system. First, a natural language color description dictionary of terms would be created and/or chosen from a set of pre-existing dictionaries 400. Then a color space in which the transformations will be performed is chosen 410. The regions of the color space are then mapped to terms in the color dictionary 420. A dictionary of command terms also needs to be created or selected 430. In embodiments, a library of basic transforms in the color space corresponding to various command terms would also be generated 440. There would be a general mapping between particular transform forms and command forms. The details of a user command would be used to tailor a transform once it was selected from the library as described in more detail with respect to FIG. 6. In addition to generating a lexicon of command terms, a syntax for using the command terms from the command dictionary in combination with the color terms of the color dictionary would be chosen as well 150. Both of the command and color term dictionaries may simply be part of one big dictionary.

Figure 5:
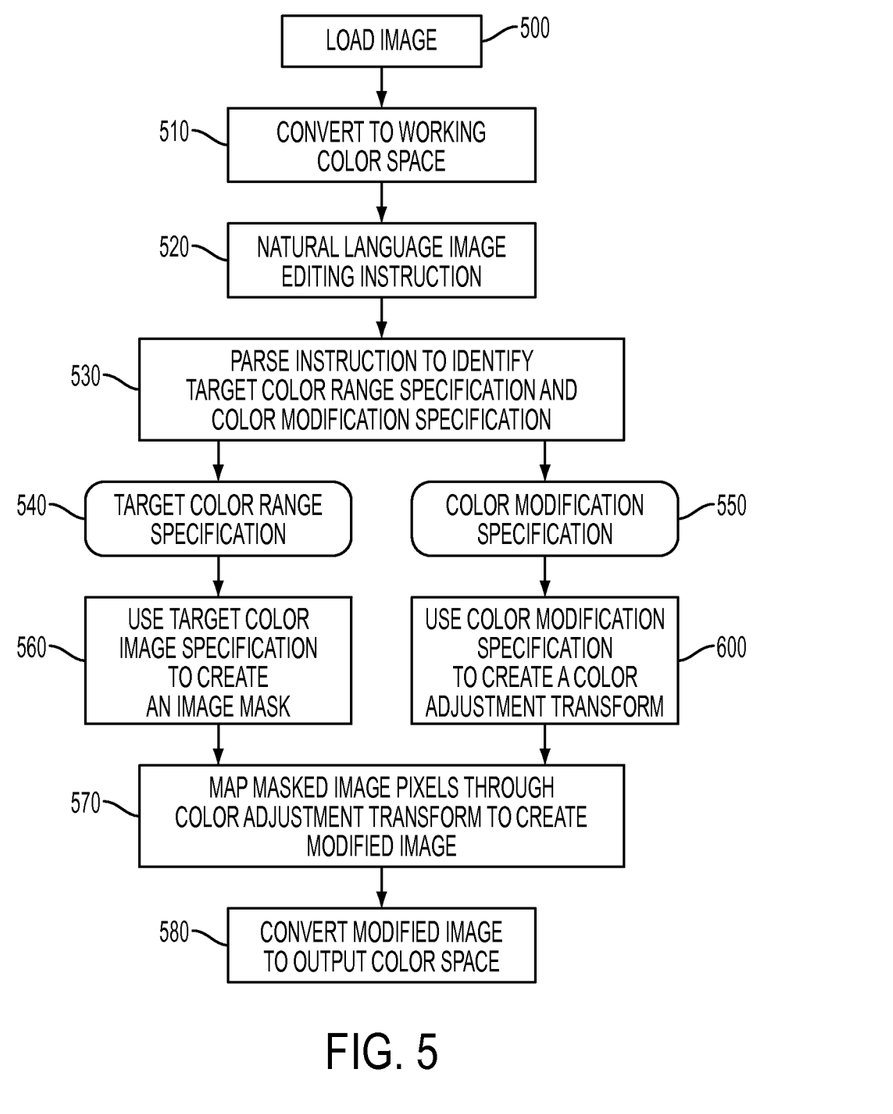
FIG. 5 is a flowchart detailing an exemplary embodiment of a natural language color modification method.

FIG. 5 illustrates an embodiment of a natural language color control and calibration system that a user would use to adjust an image or portion thereof. Again, the acts are listed in a particular order in the flowchart. However, this order should not be considered limiting, as the order of many of these acts may be changed without affecting the resulting color control system.

At 500, the user would select a subject. The subject may be, for example, a scanned or created image or a set of input colors of a multi-dimensional lookup table. The subject may also be a portion of an image. For example, the user may be able to identify a quadrant of an image or a particular object in an image that the user would want to adjust. The natural language system included herein also encompasses the ability to mark areas of an image to be adjusted using a point and click system. At 610, some or all of the selected subject would be mapped from the initial color space into the working color space of the color control system before or after the command is entered. The initial color space may be, for example, RGB on a display screen or CMYK on a printed document. For an image, for example, this may be a pixel-by-pixel mapping. However, many programs exist to reduce the time and processing power of such a mapping. For example, various algorithms use sampling techniques and/or allow a system to recognize uniform patches. The working color space could be any color encoding in which the color adjustment algorithms referenced in 530 are conveniently applied. In general, perceptually uniform, device independent color encodings are preferred as working spaces.

The user also issues a verbal or written instruction to indicate the change required in the image at 520. This command may be entered before or after the image or portion of the image is mapped into the working color space. The language used for this instruction could be the natural language of the user or it might be a language defined or limited by the application; e.g., the application may provide a user interface that could limit the language to a defined vocabulary or facilitate the parsing operation.

At 530, the program would translate the entered verbal or written instruction into a color transform in the color working space. The program would contain a set of rules or instructions for parsing the instruction and implementing a transformation to the image corresponding to the user's command. The natural language command may be parsed to separate the command into components such as, for example, a target or resultant color range specification 540, and a color modification specification 550.

The target color range specification would include the color or colors to be modified. The target color range specification may also specifically identify colors that are not to be modified. The image adjustment would then be applied only to those colors that are included in the color range specified to be adjusted. In 560, an image mask would be created from the specified color range 540 and the image in the working color space. The image adjustment will therefore be applied only to those colors that are included in the mask. In embodiments, a particular color might be present in an area of overlapping regions of specified color ranges and therefore might be contained within two or more overlapping ranges. If the user were to enter verbal commands involving both these regions then the program make an internal logic decision based upon a set of preprogrammed rules. For example, the commands may be followed consecutively with the last command entered given priority over earlier commands.

There are many methods, familiar to those of ordinary skill in the art, by which a mask can be created. One such method involves representing the specified color range as a subvolume of the working color space and then determining, for each pixel in the mapped image, if the color of the pixel is inside the specified color range subvolume. All such pixels inside the specified color range subvolume are in the mask while all pixels outside the specified color range subvolume are excluded from the mask. Another method of creating the image mask is to associate with each color in the color name dictionary or dictionaries one or more prototypical locations (points rather than subvolumes) in the working color space. For each image pixel the nearest prototypical color name location is determined and those pixels with nearest prototypical locations associated with color names in the specified color range are included in the mask. Pixels with a nearest prototypical location associated with color names not in the specified color range are excluded from the mask. While it is possible to map each individual pixel, algorithms exist to simplify such mappings. For example, various algorithms use sampling techniques and/or allow a system to recognize uniform patches.

Yet another alternative method to construct the mask is to construct a multidimensional lookup table, the input values of which sample the working color space. When the image pixel colors are mapped through this multi-dimensional lookup table the output values indicate whether the pixel are included in the mask or excluded from the mask. Such an embodiment might result in output values between 0 and 1 where a value of 0 represents exclusion from the mask and a value of 1 represents inclusion in the mask. Since multi-dimensional lookup tables generally use interpolation to determine output values the possibility of values between 0 and 1 exists. In such cases these fractional values could be retained, resulting in a fuzzy or blurred mask. In such a fuzzy or blurred mask pixels returning values between 0 and 1 would be considered to be partially included in the mask. Pixels that are partially in the mask would undergo a partial image adjustment. Alternatively, the output values might be rounded, or otherwise adjusted, to give only values of 0 or 1, thereby generating a binary mask.

Other methods for mapping such input terms into the working color space include, for example, use of Voronoi partitions, other tessellation methods, and k-D trees. A general example of such a method, suitable for both convex and non-convex regions, comprises tessellating each named region in the color space with tetrahedral simplices. Testing whether a given color lies inside any of the tetrahedra comprising the region will determine whether the color lies within the region. In the case of convex regions of the color space simpler tests not requiring tessellation of the region can be used.

In 600, the natural language instruction is used to create a color adjustment transform. There are numerous methods by which such transforms could be constructed but in general all such methods will include the act of parsing the verbal color modification specification to determine 1) the magnitude of the desired modification, 2) the property that is to be modified and 3) the direction in which it is to be modified. These three pieces of information are a minimum requirement for any color adjustment transform. Additional information might be required to more fully specify the required transform before it can be constructed.

Figure 6:
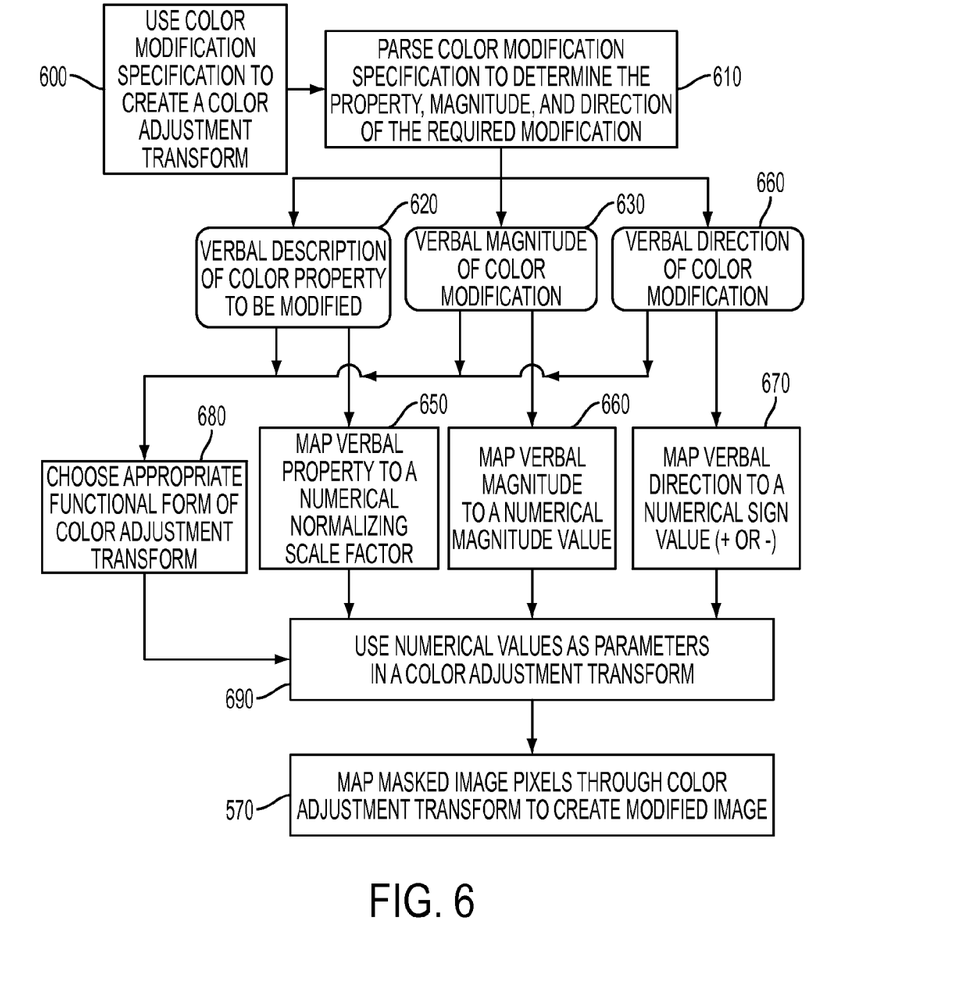
FIG. 6 is a flowchart detailing a general process for implementing a natural language command in a working color space.

Such additional information might be acquired from the pixels that are included in the mask. Such pixel-related information might include color values and spatial locations. The values of individual pixels or population statistics might be used in transform construction. What follows is a general example of transform construction, using an example command or instruction language such as, for example, those discussed herein. The acts involved in this general example of transform construction are illustrated in FIG. 6.

First, a verbal color modification specification is parsed 610 to obtain verbal specifications for the color property to be modified 620, the magnitude of the color modification 630, and the direction of the color modification 640.

The command, "Make the red colors slightly less saturated" is first parsed per into a target color range specification 540 (the red colors), and a color modification specification 550 (slightly less saturated), as noted earlier. Then, at act 600, the color modification specification is parsed into the color property to be modified 620 (saturation), the magnitude of the color modification 630 (slightly), and the direction of the color modification 640 (less). The verbal description of the color property to be modified is mapped to a numerical normalizing scale factor in step 650. This act allows for the magnitude specifications to be normalized such that the verbal descriptions of magnitude (630) correspond to equivalent or very similar perceptual changes in the target color regardless of the property that is being modified and regardless of the color being modified. For this example, the magnitude of color change requested is "slight" and this should lead to a perceptually similar "slight" change in the target "red" colors regardless of what perceptual property we are changing.

Perceptual properties can include, for example, saturation, lightness, darkness, colorfulness, chroma, hue, contrast, redness, greenness, yellowness, blueness, orange-ness, pink-ness, brown-ness, purple-ness, and grayness. Additionally, one could modify any property that could be described as (color-name)-ness by moving the selected colors in a direction toward the prototypical location of (color-name). e.g., to increase the mauve-ness of a selection of colors move them toward the prototypical location of color name 'mauve'.

At 660, the verbal magnitude of the color modification is mapped onto a numerical magnitude value. Generally, and in the interests of common sense, words that signify a larger magnitude would be mapped onto larger numerical magnitude values, but this is not a requirement. It is desirable however that the numerical magnitude scale, onto which magnitude words are mapped, corresponds linearly to the perceived magnitude that an average population, with normal color vision, associates with the verbal magnitude word or phrase.

Perceptual changes in a property will likely depend in part upon the color being modified and upon its initial scaled value in that property. For example, what constitutes a slight lessening of the saturation of reds in an image would likely be different if there was a low saturation of red in the image, then if there was a high saturation of red. In embodiments, the magnitude of a "slight" property change in the working color space would depend upon the context in which it was used.

Act 670 involves mapping the verbal direction to a numerical sign value (+ or −). This can be simply implemented by mapping the verbal direction to a multiplicative factor of +1 for verbal indications that increase a property and −1 for verbal indications that decrease a property.

The numerical values determined in 650, 660 and 670 are used as parameters in a color adjustment transform. This occurs in 690. Generally a color adjustment transform will have some pre-determined functional form and the numerical values are applied to this functional form to control its specific effect on the colors. The choice of functional form of the color adjustment transform would be made in 680. The choice might be arbitrarily made by the application designer or the functional form might be algorithmically determined by, for example, the values of the color property to be modified, the verbal magnitude of the color modification and the verbal direction of the color modification. The program implementing converting the natural language command into a transform in the color working space may have a library of basic forms to map to different sets of user instructions. Based upon the natural language command entered by the user, the program selects a functional form from this library. For example, one functional form might be chosen for lightness modifications and a different form chosen for chroma modifications. In this case, the functional form to which the numerical values determined in s 650, 660 and 670 are applied, would depend on the type of color property to be modified.

As a trivial example of applying the numerical values to a functional form, consider the simple functional form of a linear mapping. Such a mapping will have two parameters—the slope of the line and an intercept. In this trivial example, the linear function would map the original value of the specified color property to a modified output value of that property. The slope of the line could be determined from the product of the values of the numerical normalizing scale factor, the numerical magnitude value and the numerical sign value. The intercept value of such a linear mapping would generally be zero, but might also be derived from the numerical magnitude value in special cases.

More complex functional forms will generally require more parameters to define them. The numerical values determined in 650, 660 and 670 would therefore be used to determine the values of the parameters. The numerical values may simply be assigned to the parameters, or parameters may be determined by some mathematical modification of combination of the numerical values.

Returning to FIG. 5, in 570, a modified color image is created by applying the color modification transform and the image mask created in 680 and 560 respectively to the original image. Finally, the modified color image is then converted back to the original color space in 580.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for a user interface system for modifying a document with imaging components using a natural language control system executed via a processor with a memory storing executable instructions having the method, comprising:
   receiving the document from an image input device;
   presenting an image modification in real time within an image that is displayed in a first view of a display while the image modification is received as input from a user; and
   presenting a text-based interface in a second view, the text-based interface presenting text-based categories corresponding to portions of a human readable sentence used to generate the image modification;
   displaying in a window more than one human readable sentence corresponding respectively to more than one image modification generated;
   upon receiving a user specified ordering with a corresponding priority of the more than one human readable sentence for the respective one or more image modification generated, sorting the one or more image modification according to a user specified input of the more than one human readable sentence displayed in the window, wherein sentences with a higher user specified priority in the user specified order generate the respective image modifications in the image before other image modifications displayed in descending order of priority in the window, and wherein the order is dynamically changed by the user through a user interface.

2. The method of claim 1, further comprising:
   presenting a first text-based category in the text-based interface having various color selections for receiving a color to be modified in the document from the user;
   presenting a second text-based category in the text-based interface having selections for receiving a magnitude of the image modification or a resultant image modification;
   presenting a third text-based category in the text-based interface having selections different from the second text-based category for receiving the magnitude or the resultant image modification;
   receiving a selection respectively from the first, second and third text-based category; and
   compiling and presenting the human readable sentence in a window of the text-based interface representing the image modification while the modification is displayed in the image.

3. The method of claim 1, wherein the image comprises a graphic image preselected from among a database of graphic images to represent the document, a thumbnail representation of the document, or the document to be modified.

4. The method of claim 1, wherein the text-based categories comprise questions presented in the user interface for obtaining a color property selection from the user comprising a color to be modified, a magnitude of the modification, and a resultant image modification.

5. The method of claim 2, wherein presenting the first text-based category comprises presenting a first question to the user for a color to be selected for the modification having a drop down menu with various color selections;
   wherein presenting the second text-based category comprises presenting a second question to the user for the magnitude or the resultant image modification having a drop down menu with various text-based selections comprising the magnitude or resultant image modification selections;
   wherein presenting the third text-based category comprises presenting a third question to the user for the magnitude or the resultant image modification having a drop down menu with various text-based selections comprising or resultant image modification selections;
   wherein the second question and third question correspond respectively to the magnification or the resultant color selections in particular and are different from one another, and the resultant image modification is indicative of a direction by which the image modification is directed towards.

6. The method of claim 2, wherein the second text-based category is actively presented to the user upon receiving a selection from the first text-based category, and the third text-based category is actively presented to the user upon receiving a selection from the second text-based category.

7. The method of claim 2, wherein the first text-based category comprises a first portion of the human readable sentence, the second text-based category comprises a second portion of the human readable sentence, and the third text-based category comprises a third portion of the human readable sentence.

8. The method of claim 1, wherein the image modification presented in real time is presented within a portion of the image that is displayed in the first view, the portion comprising the color selected for the modification and/or objects within the image selected by the user to be modified.

9. The method of claim 1, further comprising:
   receiving the color selected to be modified via a touch sensed directly on the color in the image within the display.

10. The method of claim 1, further comprising:
    mapping the document into a working color space;
    wherein the human readable sentence comprises a natural language command;
    receiving the natural language command to modify the color in a portion of the photo image selected by the user, wherein the natural language command specifies the color selected for the image modification in the photo image, and the modification associated therewith in natural language;
    parsing the natural language command into a description of a color property to be modified, the magnitude of the modification, and the resultant image modification;
    converting the parsed natural language command into a transform in the working color space;
    applying the transform to the color selected by the user of the at least a portion of the document in the working color space; and
    modifying the selected color of the photo image based upon application of the transform in the working color space.

11. A method for a user interface system for modifying a document with imaging components using a natural language control system executed via a processor with a memory storing executable instructions having the method, comprising:
    receiving the document from an image input device;
    presenting an image modification in real time within an image that is displayed in a first view of a display while the image modification is received by a user;

presenting a text-based interface in a second view concurrently with the first view having the image, the text-based interface presenting text-based categories corresponding to portions of a complete human readable sentence used to generate the image modification;

displaying in the second view more than one human readable sentence corresponding respectively to more than one image modification generated;

upon receiving a user specified ordering with a corresponding user specified priority of the more than one human readable sentence for the respective image modifications generated, sorting the one or more image modifications described in the more than one human readable sentence in the window according to the user specified ordering, wherein sentences with a higher user specified priority in the user specified ordering generate the respective image modifications in the image first thereby affecting the image modification of subsequent sentences with a lower user specified priority and wherein the ordering is dynamically changed by the user through a user interface.

12. The method of claim 11, the text-based categories comprising user selections respectively for color properties to be modified comprising one or more colors to be modified, one or more magnitudes of the modification, and one or more resultant modifications, the method further comprising:

presenting the selections from the categories selected by the user in a window of the second view to display a human readable sentence representing the image modification while the modification is displayed in the image.

13. A user interface system of an imaging system for modification of a document having a natural language control system, comprising:

a user display comprising a first view area having an image displayed therein for the image modification which is selected by a user and configured to present the image modification in real time to the user in the image within the view of the display at portions of the photo image having the color; and a textual interface comprising text-based categories in a second view with text-based selections comprising color selections, magnitude selections, and resultant image modification selections respectively for the image modification in the document;

a window of the second view for displaying one or more human readable sentences comprising portions within each sentence respectively representing a color selection, a magnitude selection, and a resultant image modification; and a sorting engine configured to sort the one or more human readable sentences that respectively correspond to image modifications, the sorting based on a specified priority inputted by the user to the engine of the one or more complete human readable sentences for the respective image modifications, wherein sentences with a higher user specified priority in the specified priority generate the respective image modifications in the image first thereby affecting the image modification of sentences with subsequent lower priority and wherein the priority is dynamically changed by the user through a user interface.

14. The system of claim 13, wherein the text-based categories comprise a first text-based category having a first portion of a complete human readable sentence, the second text-based category having a second portion of the complete human readable sentence, and the third text-based category having a third portion of the complete human readable sentence.

15. The system of claim 13, wherein the image comprises a graphic image preselected from among a database of graphic images to represent the document, a thumbnail representation of the document, or the document to be modified.

16. The system of claim 13, wherein the text-based categories comprise questions presented in the user interface for obtaining a color property selection from the user comprising a color to be modified, a magnitude of the modification, and a resultant image modification comprising a color for the modification to be directed towards.

17. The system of claim 13, wherein the natural language control system comprises:

a dictionary of ordinary language color terms corresponding to the text-based selections, wherein each portion of a working color space is mapped to at least one term in the color term dictionary;

an ordinary language command lexicon and syntax for use with the ordinary language color terms that correspond to transformations in the working color space; and a processor configured to parse the ordinary language command related to colors in the document selected for modification, to determine which portions of the image to modify by consulting the dictionary of ordinary language terms in view of the parsed ordinary language command, and to determine how to adjust the image based on the color to be modified by consulting the ordinary language lexicon and syntax.

* * * * *